United States Patent
Carr et al.

(10) Patent No.: US 6,939,097 B2
(45) Date of Patent: Sep. 6, 2005

(54) GROUND WASHER

(75) Inventors: Scott H. Carr, Glenview, IL (US);
Dale H. Edwards, Jr., Elgin, IL (US);
Eric G. Parker, Winnetka, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 10/647,877

(22) Filed: Aug. 25, 2003

(65) Prior Publication Data

US 2004/0101383 A1 May 27, 2004

Related U.S. Application Data

(60) Provisional application No. 60/428,045, filed on Nov. 21, 2002.

(51) Int. Cl.⁷ .............................. F16B 43/00
(52) U.S. Cl. .................. 411/368; 411/155; 411/544
(58) Field of Search .................. 411/155, 156, 411/160, 161, 368, 531, 533, 542, 544, 545

(56) References Cited

U.S. PATENT DOCUMENTS

| | | | | |
|---|---|---|---|---|
| 436,737 A | * | 9/1890 | Lewis ..................... 411/156 |
| 945,127 A | * | 1/1910 | Kollenberg ............... 411/156 |
| 1,320,259 A | * | 10/1919 | Martens .................. 411/155 X |
| 1,801,999 A | * | 4/1931 | Bowman .................. 411/131 |
| 1,963,535 A | * | 6/1934 | Trotter .................... 411/156 |
| 2,297,957 A | * | 10/1942 | Hanneman ................ 411/155 |
| 2,735,470 A | * | 2/1956 | Poupitch ................. 411/155 X |
| 3,090,203 A | | 5/1963 | Durget |
| 3,626,357 A | | 12/1971 | Kindel et al. ............ 339/95 A |
| 3,882,752 A | * | 5/1975 | Gutshall ................. 411/371.1 |
| 3,914,001 A | | 10/1975 | Nelson et al. ............ 339/14 R |
| 4,095,431 A | | 6/1978 | Hannan ................... 61/45 B |
| 4,302,136 A | * | 11/1981 | Abe et al. ................ 411/158 |
| 4,453,033 A | | 6/1984 | Duff et al. ............... 174/52 EP |
| 4,518,282 A | | 5/1985 | Wilcox et al. ........... 405/259 |
| 4,909,691 A | * | 3/1990 | Bogel .................... 411/531 |
| 4,943,247 A | | 7/1990 | Wise ..................... 439/883 |
| D310,324 S | | 9/1990 | Bernacchi et al. ......... D8/399 |
| 5,201,625 A | * | 4/1993 | Takenouchi et al. ...... 411/544 X |
| 5,453,027 A | | 9/1995 | Buell et al. .............. 439/433 |
| 5,490,789 A | | 2/1996 | Simons .................. 439/101 |
| 5,628,587 A | * | 5/1997 | Lesslie .................. 411/545 X |
| 5,687,453 A | | 11/1997 | Megregian et al. ........ 16/221 |
| 5,807,052 A | * | 9/1998 | Van Boven et al. ....... 411/353 |
| D403,750 S | | 1/1999 | Fabian ................... D23/254 |

\* cited by examiner

Primary Examiner—Flemming Saether
(74) Attorney, Agent, or Firm—Mark W. Croll; Paul F. Donovan

(57) ABSTRACT

A ground washer is disclosed for attachment by a grounding screw to a grounding terminal. The washer device includes a disc-shaped member which defines an opening for the reception therethrough of the grounding screw. The member has an annular portion having a first and a second surface, the annular portion surrounding the opening. The annular portion cooperates with a plurality of teeth extending from the grounding terminal towards the annular portion of the member. A conical portion having a first and a second end, is disposed concentrically around the annular portion. A raised annular ridge is disposed between the annular portion and the conical portion, the ridge cooperating with the grounding screw such that when the grounding screw is turned, the ridge urges the annular portion into contact with the plurality of teeth of the grounding element. An annular flange is disposed concentrically around the conical portion, the flange mating with the grounding terminal. The arrangement is structured such that when the grounding screw is turned, the conical portion resiliently biases the annular ridge and the annular portion towards the plurality of teeth extending towards the annular portion while the flange stablizes the biasing of the annular ridge so that an even contact between the plurality of teeth and the annular portion is facilitated.

12 Claims, 3 Drawing Sheets

GROUND WASHER

CROSS REFERENCE TO RELATED APPLICATION

This Non-Provisional Application claims the benefit of U.S. Provisional Application Ser. No. 60/428,045 filed Nov. 21, 2002.

FIELD OF THE INVENTION

The present invention relates to a ground washer. More specifically, the present invention relates to a ground washer for attachment by a grounding screw to a grounding terminal.

BACKGROUND OF THE INVENTION

Known ground washers are generally flat or of a square cone design. Under load, flat washer tend to exert a clamp load in a non-specific path. In other words, flat washers may not be centered around a mating bolt, which leads to uneven load on a grounding terminal. As a result, with terminal shift or corrosion, for example, the ground path can be lost. Another problem with flat washers, as with square-cone washers, is that they are not accustomed to prevent loosening of the joint, especially when subjected to vibration. Yet another problem with square-cone washers is that they only provide a minimum amount of contact with the grounding terminal, thereby adversely affecting the overall performance of the assembly. The present invention addresses the foregoing problems and other problems of these and other prior designs. In general, grounding washers according to the principles of the present invention provide a new and innovative method of grounding an electrical circuit to a metal or other conducting surface.

In one embodiment of the present invention, there is provided a washer having a centrally formed column or cylinder that is adapted to take the clamp load of the associated grounding screw as a column load. The washer of the present invention is configured to include a spring portion that is adapted to press on the remainder of the grounding terminal with substantially even force. The washer of the present invention is designed to provide an improved ground path over a greater period of time as compared to known flat washers and other washers. A feature of the compressible portion of the washer is that it creates a spring load to minimize unwanted loosening of the joint.

Preferably, the ground washer and associated screw can be assembled together as a single-unit, known as a "SEMS" design. In one situation, a screw blank is passed through the hole in the washer and the threads are thereafter formed on the blank. The last thread portion, which is the thread portion closest to the head, holds the washer between it and the bottom of the head. In this way, the assembly can be more easily and efficiently used in various applications to create an assembly.

The design according to the present invention ensures that the washer will be centered around the shaft of the screw to provide an even load against the grounding terminal. Although the preferred embodiment shows the washer having a circular opening, the opening may have an oval shape or other suitable shapes according to the principles of the present invention. A feature of the invention is to provide a substantially even load distribution over the teeth of the grounding terminal to enhance the grounding effect. Another feature is that although the washer is flattened upon final assembly, it is adapted to be reusable. Yet another feature of the invention is that the grounding surface is substantially sealed from corrosion when the bearing surface on the ID is torqued down, and the outer bearing surface is flat against the grounding surface.

Although the invention will be further described in connection with the assembly shown in the attached drawings, the invention is capable of use in other applications, and the various assemblies illustrated are merely shown and described as examples of such applications.

Other features and advantages of the present invention will be readily apparent to those skilled in the art by a consideration of the detailed description of a preferred embodiment of the present invention contained herein.

SUMMARY OF THE INVENTION

The present invention relates to a ground washer device for attachment by a grounding screw to a grounding terminal. The washer device includes a disc-shaped member which defines an opening for the reception therethrough of the grounding screw. The member has an annular portion having a first and a second surface, the annular portion surrounding the opening. The annular portion cooperates with a plurality of teeth extending from the grounding terminal towards the annular portion of the member. A conical portion having a first and a second end, is disposed around the annular portion. A raised annular ridge is disposed between the annular portion and the conical portion, the ridge cooperating with the grounding screw such that when the grounding screw is turned, the ridge urges the annular portion into contact with the plurality of teeth of the grounding element. An annular flange is disposed concentrically around the conical portion, the flange mating with the grounding terminal. The arrangement is structured such that when the grounding screw is turned, the conical portion resiliently biases the annular ridge and the annular portion towards the plurality of teeth extending towards the annular portion while the flange stablilizes the biasing of the annular ridge so that a substantially even contact between the plurality of teeth and the washer is facilitated.

Other features and advantages of the present invention will become apparent to those skilled in the art upon review of the following detailed description, claims and drawings in which like numerals are used to designate like features.

Figure 1:
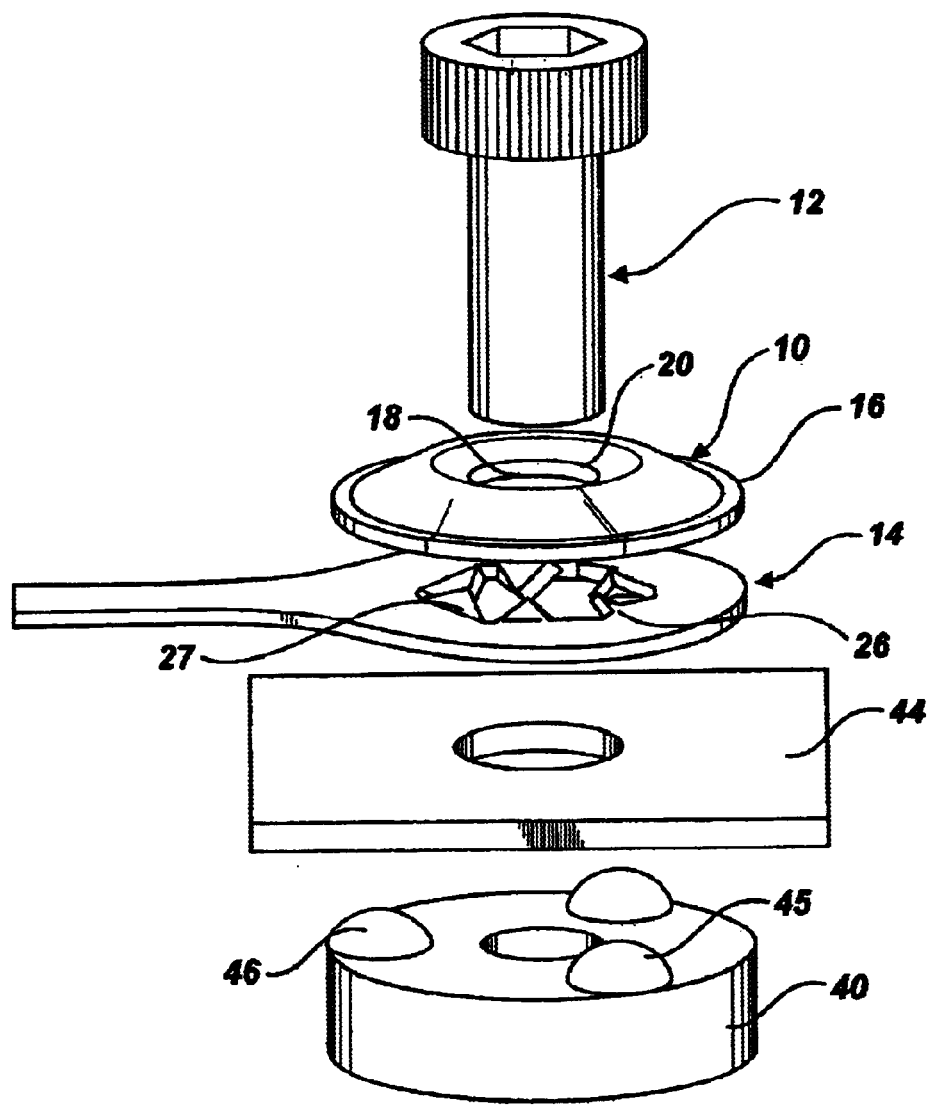
FIG. 1 is an exploded perspective view showing a ground washer according to the present invention that is adapted for attachment to a grounding terminal by a grounding screw.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENT

FIG. 1 is an exploded perspective view showing a ground washer generally designated 10 according to the present invention adapted for attachment by a grounding screw 12 to a grounding terminal generally designated 14. As shown in FIG. 1, the washer 10 includes a disc-shaped member generally designated 16 which defines an opening 18 for the reception therethrough of the grounding screw 12. Preferebly, the washer 10 is made of a metallic or other suitable material, and the opening 18 is of a circular configuration. However, the opening 18 can take on the shape of different configurations, such as an oval configuration.

Figure 2:
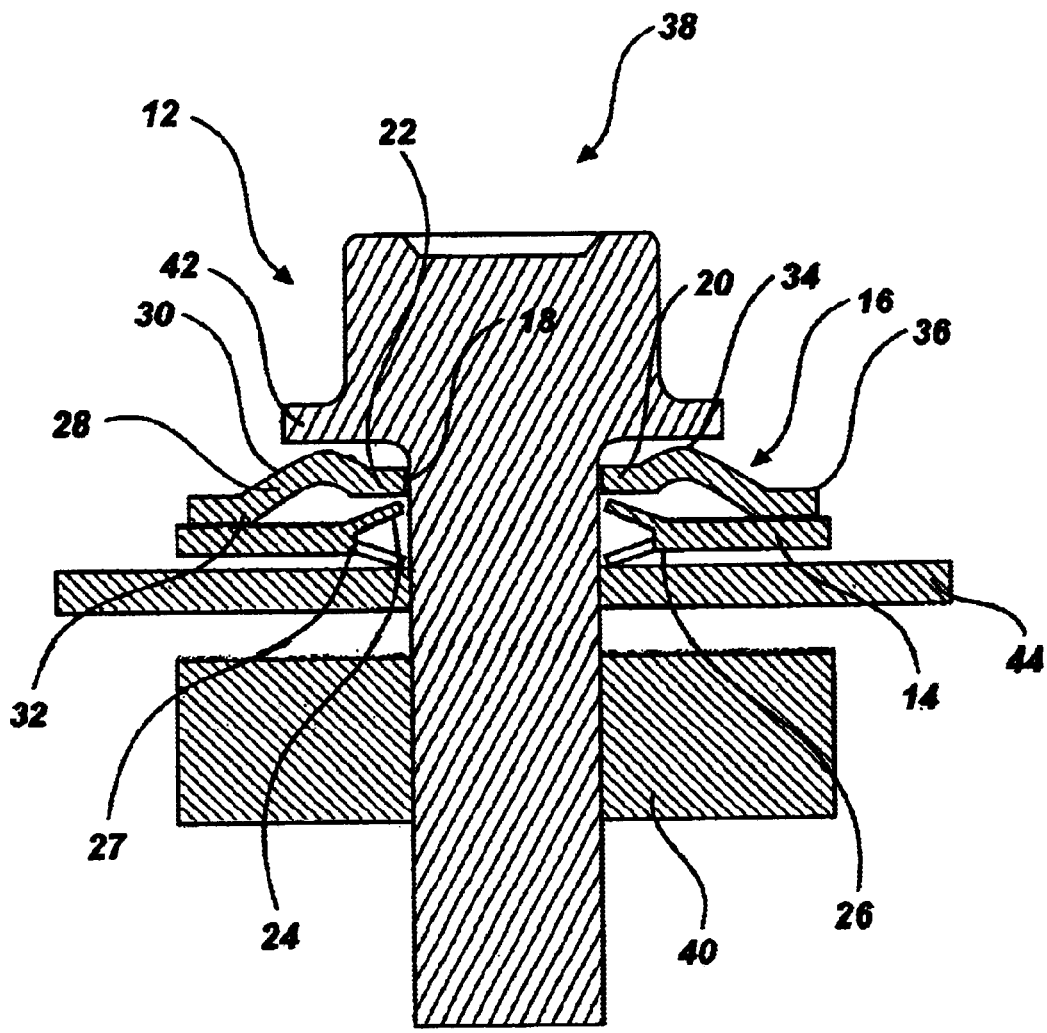
FIG. 2 is a sectional view of the assembly as shown in perspective in FIG. 1.

FIG. 2 is a sectional view of the assembly shown in perspective in FIG. 1. As shown in FIG. 2, the member 16 has an annular portion 20 having a first and a second surface 22 and 24 respectively, the annular portion 20 surrounding the opening 18. The second surface 24 of the annular portion 20 being adapted to engage a plurality of teeth 26, 27 extending from the grounding terminal 14 towards the annular portion 20 of the member 16. A conical portion 28 having a first and a second end 30 and 32 respectively, is disposed concentrically around the annular portion 20. A raised annular ridge 34 is disposed between the annular portion 20 and the conical portion 28, the ridge 34 being adapted and configured to cooperate with the grounding screw 12 such that when the grounding screw 12 is turned as indicated by the arrow 38, the annular portion 20 is urged into contact with the plurality of teeth 26, 27 of the grounding terminal 14.

Figure 3:
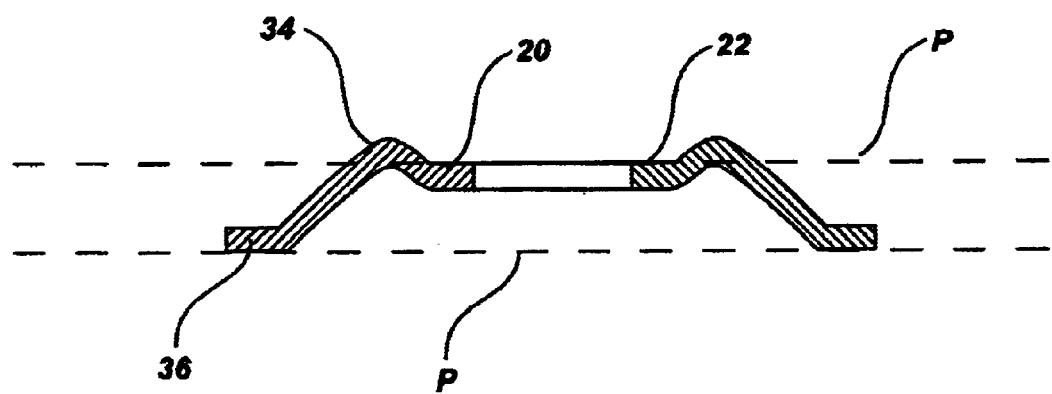
FIG. 3 is a sectional view of the washer shown in FIGS. 1 and 2.

An annular flange 36 is disposed concentrically around the conical portion 28, the flange 36 being adapted to also engage the grounding terminal 14. The arrangement is structured such that when the grounding screw 12 is turned as indicated by the arrow 38, the conical portion 28 resiliently biases the annular ridge 34 and the annular portion 20 towards the plurality of teeth 26, 27 extending towards the annular portion 20 while the flange 36 stablilizes the biasing of the annular ridge 34 so that an even contact between the plurality of teeth 26, 27 and the annular portion 20 is facilitated. In essence, the conical portion 28 is caused to be compressed or somewhat flattened out so that the annular portion 20 and flange 36 are within or very nearly within the same plane. With reference to FIG. 3 before the washer 10 is compressed, the first face 22 of the annular portion 20 is disposed in a first plane P. The first plane P is disposed between the annular ridge 34 and the annular flange 36. The annular flange 36 is disposed in a second plane p, the first and second planes P and p respectively being spaced and parallel relative to each other.

The annular portion 20 and flange 26 provide a plurality of contacts on the grounding terminal 14, thereby enhancing the functionability of the ground washer 10. The conical portion 28 is adapted to take the clamp load of the associated grounding screw 12 and provide a spring force. The washer 10 is adapted and configured to press on the terminal 14 with substantially even force. A feature of the compressible portion 28 is that it creates a spring load or force to minimize unwanted loosening of the joint in the final assembly. As best shown in FIG. 2, preferably, the head of the screw 12 sits atop the ridge 34, extending over the ridge 34 and along the conical portion 28. This arrangement enhances the flattening of the washer 10 as the screw is torqued or tightened down. Even though the washer 10 is compressed upon final assembly, it is preferably adapted for reuse. The spring like nature of the conical portion 28 enables the reusability of the washer 10.

In an alternative embodiment (not shown), the conical portion 28 and ridge 34 can be configured together to form a "J" or hooked shape design thereby eliminating the flat annular portion 20.

In application, the washer 10 is particularly suited for use in combination with a weld nut 40 having a plurality of protrusions 45 and 46 which are urged against a sheet of metal 44 when the screw 12 is tightened. In operation of the washer 10, a grounding screw 12 is inserted through the opening 18 and is screwed or turned as indicated by the arrow 38. As the screw 12 threadably cooperates with and is tightened relative to the weld nut 40, a collar 42 of the screw 12 urges the annular ridge 34 downwardly so that the annular portion 20 is substantially evenly urged into contact with the plurality of teeth 26–27 of the grounding terminal 14. Downwardly depending teeth extending from the grounding terminal 14 engage the sheet of metal 44 disposed between the weld nut 40 and the grounding terminal 14. As the screw is tightened, the conical portion 28 acts as a spring between the annular portion 20 and the annular flange 36 so that the teeth 26–27 surrounding the opening 18 are evenly urged into engagement with the annular portion 20 while the annular flange 36 forms a secondary contact with the grounding terminal 14 and tends to stabilize the conical portion 28 during the tightening of the screw 12.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art. Various features of the invention are set forth in the following claims.

What is claimed is:

1. A ground washer for attachment by a grounding screw to a grounding terminal, said washer comprising:

a disc-shaped member which defines an opening for the reception therethrough of the grounding screw, said member including an annular portion surrounding said opening and being in a first plane, said annular portion being a flat surface having a first end adjacent to said opening and a second end spaced from said first end;

a conical portion having a first and a second end, said conical portion being disposed concentrically around said annular portion;

a raised annular ridge disposed between said annular portion and said conical portion so as to provide an engagement surface for the grounding screw, wherein said raised annular ridge extends from said first end of said conical portion to said second end of said annular portion; and an annular flange disposed concentrically around said conical portion and being in a second plane which is spaced from, but is generally parallel with, said first plane;

such that when the grounding screw is tightened down, the grounding screw pushes against said annular ridge so as to cause said conical portion of said washer to be compressed between the grounding screw and the grounding terminal thereby urging said first plane towards said second plan and forcing said disc-shaped member into contact with the grounding terminal so that said annular portion and said annular flange both make grounding contact with the grounding terminal.

2. A ground washer as set forth in claim 1, wherein said washer is metallic.

3. A ground washer as set forth in claim 1, wherein said opening is of a circular configuration.

4. A ground washer as set forth in claim 3, wherein said annular portion, said raised annular ridge, said conical portion and said annular flange are disposed concentrically relative to said opening.

5. A ground washer as set forth in claim 1, wherein said opening is of an oval configuration.

6. A ground washer as set forth in claim 1, wherein said annular portion includes a first surface and a second surface which is adapted to contact a plurality of teeth on the grounding terminal.

7. A ground washer as set forth in claim 1, wherein said first end of said conical portion extends from said raised annular ridge.

8. A ground washer as set forth in claim 1, wherein said raised annular ridge extends from said first end of said conical portion to said annular portion.

9. A ground washer as set forth in claim 1, wherein said annular flange extends from said second end of said conical portion.

10. A ground washer as set forth in claim 1, wherein said annular portion and said annular flange both make grounding contact with the grounding terminal.

11. A ground washer as set forth in claim 1, wherein said conical portion and said ridge are of a "J" or hooked shaped configuration.

12. A ground washer as set forth in claim 1, wherein said washer is configured in such a manner so as to allow the grounding screw to extend over the raised annular ridge and above said conical portion.

* * * * *